(12) United States Patent
Nobukuni

(10) Patent No.: US 11,780,272 B2
(45) Date of Patent: Oct. 10, 2023

(54) TIRE

(71) Applicant: Sumitomo Rubber Industries, Ltd., Kobe (JP)

(72) Inventor: Shingo Nobukuni, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/569,103

(22) Filed: Jan. 5, 2022

(65) Prior Publication Data

US 2022/0266635 A1    Aug. 25, 2022

(30) Foreign Application Priority Data

Feb. 22, 2021   (JP) ................................ 2021-026483

(51) Int. Cl.
*B60C 11/13*      (2006.01)
*B60C 11/03*      (2006.01)

(52) U.S. Cl.
CPC ....... *B60C 11/1307* (2013.01); *B60C 11/0306* (2013.01); *B60C 2011/0341* (2013.01); *B60C 2011/1338* (2013.01); *B60C 2200/14* (2013.01)

(58) Field of Classification Search
CPC ......... B60C 2011/1338; B60C 11/1307; B60C 11/13; B60C 13/001; B60C 11/0306
See application file for complete search history.

(56) References Cited

U.S. PATENT DOCUMENTS

| | | | |
|---|---|---|---|
| 2001/0032691 A1* | 10/2001 | Ohsawa ................. | B60C 11/13 152/209.18 |
| 2009/0218019 A1* | 9/2009 | Paturle .................. | B29C 33/424 428/88 |
| 2017/0066292 A1 | 3/2017 | Cambon et al. | |
| 2018/0072107 A1 | 3/2018 | Muhlhoff et al. | |
| 2019/0329599 A1* | 10/2019 | Horiguchi ........... | B60C 11/1369 |
| 2020/0062043 A1* | 2/2020 | Ishigaki ................ | B60C 13/001 |

FOREIGN PATENT DOCUMENTS

| | | |
|---|---|---|
| JP | 2004-196145 A | 7/2004 |
| JP | 2019-147473 A | 9/2019 |
| WO | WO 2019/240198 A1 | 12/2019 |

OTHER PUBLICATIONS

Extended European Search Report for European Application No. 22155803.4, dated Jun. 24, 2022.

\* cited by examiner

*Primary Examiner* — Robert C Dye
*Assistant Examiner* — Nicholas J Weiler
(74) *Attorney, Agent, or Firm* — Birch, Stewart, Kolasch & Birch, LLP

(57) ABSTRACT

A tire includes a tread portion. The tread portion is provided with grooves each having a pair of groove walls. At least one of the groove walls is provided on a surface thereof with a pattern portion having a plurality of micro-protrusions. The pattern portion is provided with the micro-protrusions at a density of 1 to 5 per 1 mm² of the groove wall area.

20 Claims, 5 Drawing Sheets

TIRE

RELATED APPLICATIONS

This application claims the benefit of foreign priority to Japanese Patent Applications No. JP2021-026483, filed Feb. 22, 2021, which are incorporated by reference in its entirety.

FIELD OF THE INVENTION

The present disclosure relates to a tire.

BACKGROUND OF THE INVENTION

The following Patent Document 1 describes a tire having middle land regions provided with first middle lateral grooves. The first middle lateral grooves each include an outer groove extending inward in a tire axial direction from one of shoulder main grooves. The outer groove has a groove width smoothly decreasing toward the shoulder main groove. The outer groove configured as such is said to be able to compress mud hard and improve mud performance.

PRIOR ART

Patent Document

[Patent Document 1]
Japanese Unexamined Patent Application Publication No. 2019-147473

SUMMARY OF THE INVENTION

Problems to be Solved by the Invention

However, an increase in the groove width increases the volume of the groove, which in turn increases the noise level during running.

The present disclosure was made in view of the above, and a primary object thereof is to provide a tire capable of improving the mud performance without impairing noise performance.

Means for Solving the Problems

The present disclosure is a tire including a tread portion, wherein the tread portion is provided with grooves, each of the grooves includes a pair of groove walls, at least one of the groove walls is provided on a surface thereof with a pattern portion having a plurality of micro-protrusions, and the pattern portion is provided with the micro-protrusions at a density of 1 to 5 per 1 mm$^2$ of the groove wall area.

Effects of the Invention

By adopting the above configuration, it is possible that the tire of the present disclosure improves the mud performance without compromising the noise performance.

DETAILED DESCRIPTION OF THE INVENTION

An embodiment of the present disclosure will now be described in conjunction with accompanying drawings.

Figure 1:
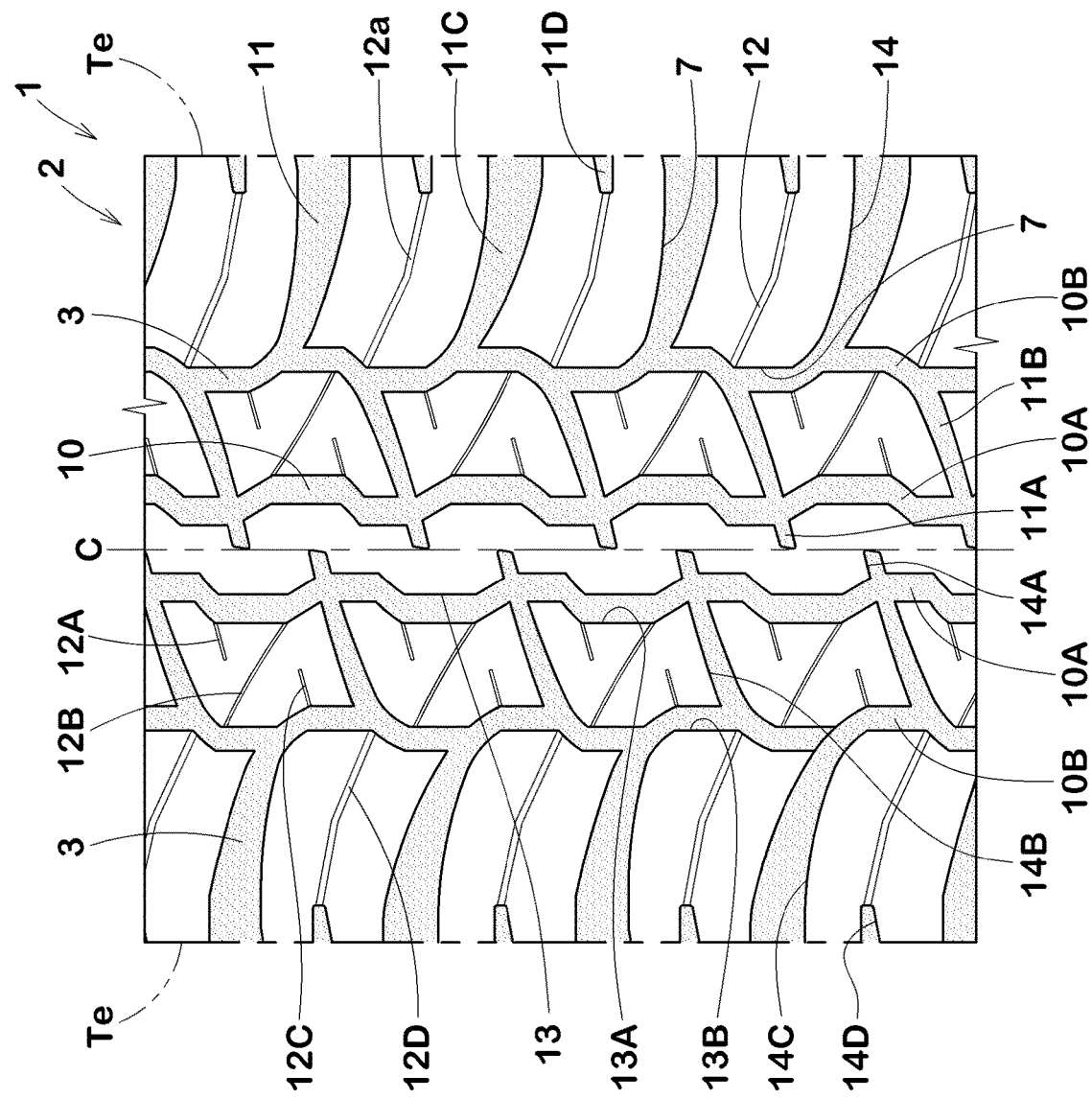
FIG. 1 a plan view of a tread portion of a tire according to one embodiment of the present disclosure.

FIG. 1 is a plan view of a tread portion 2 of a tire 1 of the present embodiment. FIG. 1 shows the tread portion 2 of the pneumatic tire 1 for a passenger car, as a preferred embodiment. However, the present disclosure may be employed, for example, in a pneumatic tire for heavy duty and other categories of tires.

As shown in FIG. 1, the tread portion 2 of the present embodiment is provided with grooves 3. In the present specification, a groove is referred to as a groove-shaped body with a width of 1.5 mm or more.

Figure 2A:
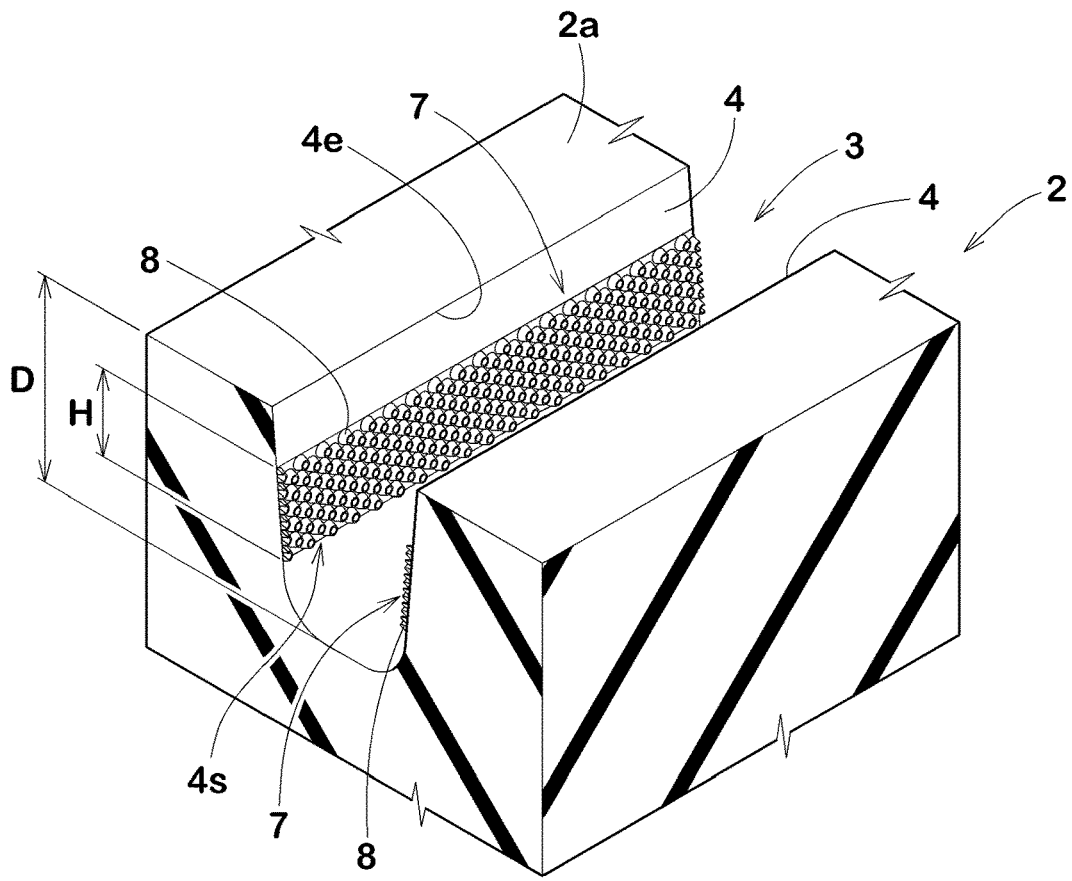
FIG. 2A a perspective view of one of the grooves in FIG. 1.
Figure 2B:
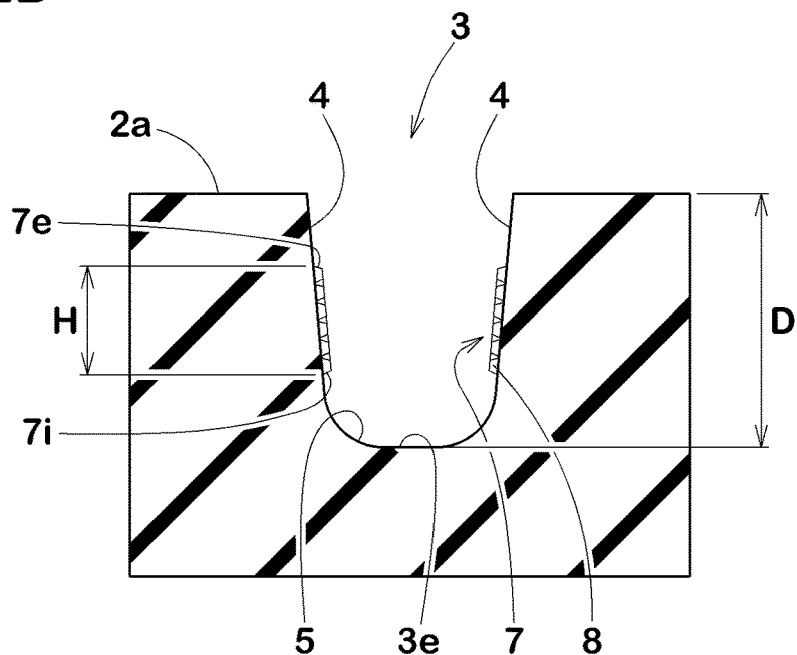
FIG. 2B a lateral cross-sectional view of FIG. 2A.

FIG. 2A is a perspective view of one of the grooves 3 in FIG. 1. FIG. 2B is a lateral cross-sectional view of FIG. 2A. As shown in FIGS. 2A and 2B, each of the grooves 3 of this embodiment includes a pair of groove walls 4. Each of thew grooves 3 also includes a groove bottom 5 connecting inner ends in a tire radial direction of a pair of the groove walls 4. Each of the groove walls 4 extends radially inward from a ground contacting surface ($2a$). The groove bottom 5 is an area within 10% of a groove depth (D) from a maximum depth portion ($3e$) in each of the grooves 3.

At least one of the pair of the groove walls 4 is provided on a surface ($4s$) thereof with a pattern portion 7 having a plurality of micro-protrusions 8. The pattern portion 7 is provided with the micro-protrusions 8 at a density of 1 to 5 per 1 mm$^2$ of the groove wall area. The micro-protrusions 8 increase scratching force, shearing force and frictional force against mud that has entered the grooves 3, therefore, it is possible that the mud performance is improved. In addition, the micro-protrusions 8 transmit the vibration of the tread portion 2 during running to the mud attached to the groove walls 4, and promote the separation of the mud from the groove walls 4. Therefore, it is possible that the tire 1 of the present embodiment suppresses mud clogging in the grooves 3, and consequently, excellent mud performance is maintained for a long period of time during running. Furthermore, since the above effect can be obtained without increasing the groove volume, the tire 1 of the present embodiment does not impair the noise performance.

In particular, since the density of the micro-protrusions 8 is 1 or more per 1 mm$^2$ of the groove wall area, it is possible that the aforementioned vibration during running is effectively transmitted to the mud attached to the groove walls 4. Further, since the density of the micro-protrusions 8 is 5 or less per 1 mm$^2$ of the groove wall area, the rigidity of the micro-protrusions 8 is maintained high, therefore, it is possible that the above-mentioned effect is exerted for a long time.

In the present specification, the dimensions and the like of various parts of the tire 1 are measured in a standard state. The standard state is a state in which the tire 1 is mounted on a standard rim (not shown), inflated to a standard inner pressure, and loaded with no tire load. The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard inner pressure" is air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in TRA, and "INFLATION PRESSURE" in ETRTO. If the tire 1 is for passenger cars, the standard inner pressure is 180 kPa.

In the present embodiment, the pattern portion 7 is provided on both groove walls 4. Therefore, the above-described effects are exerted effectively.

As shown in FIG. 1, the grooves 3 include circumferential grooves 10 extending in the tire circumferential direction and axial grooves 11 extending in the tire axial direction, for example. In the present specification, the expression "extending in the tire circumferential direction" means extending at an angle of 45 degrees or more with respect to the tire axial direction. Further, the expression "extending in the tire axial direction" means extending at an angle of less than 45 degrees with respect to the tire axial direction. Furthermore, the grooves 3 are shown shaded in FIG. 1 for ease of understanding.

The circumferential grooves 10 extend continuously in the tire circumferential direction, for example. The circumferential grooves 10 of the present embodiment include a pair of crown circumferential grooves 10A arranged on both sides of a tire equator (C), and a pair of shoulder circumferential grooves 10B, each shoulder circumferential groove 10B arranged axially outside a respective one of the crown circumferential grooves 10A.

The axial grooves 11 of the present embodiment include crown axial grooves 11A, middle axial grooves 11B, shoulder axial grooves 11C, and shoulder small axial grooves 11D. The crown axial grooves 11A extend axially inward from the pair of the crown circumferential grooves 10A, for example. Each of the middle axial grooves 11B connects one of the crown circumferential grooves 10A and one of the shoulder circumferential grooves 10B adjacent thereto, for example. Each of the shoulder axial grooves 11C connects one of the shoulder circumferential grooves 10B and one of tread edges (Te) adjacent thereto, for example. Each of the shoulder small axial grooves 11D extends axially inward from one of the tread edges (Te) and is formed to have a length smaller than a length of each of the shoulder axial grooves 11C, for example. The grooves 3 are not limited to such a configuration, and various configurations can be adopted.

Further, the tread portion 2 of the present embodiment is provided with sipes 12. The sipes 12 include first sipes 12A, second sipes 12B, third sipes 12C, and fourth sipes 12D, for example. Each of the first sipes 12A extends axially outward from one of the crown circumferential grooves 10A to terminate to have a closed end without intersecting with one of the shoulder circumferential grooves 10B adjacent thereto. Each of the second sipes 12B directly connects one of the crown circumferential grooves 10A and one of the shoulder circumferential grooves 10B adjacent thereto. Each of the third sipes 12C extends axially inward from one of the shoulder circumferential grooves 10B to terminate to have a closed end without intersecting with one of the crown circumferential grooves 10A adjacent thereto. Each of the fourth sipes 12D extends axially outward from one of the shoulder circumferential grooves 10B. Further, the sipes are incisions each having a width of less than 1.5 mm in the present specification.

The tread edges (Te) mean axially outermost ground contacting positions when the tire 1 in the standard state is in contact with a flat surface with zero camber angle by being loaded with a standard tire load. The "standard tire load" is a tire load specified for the concerned tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO.

Each of the sipes 12 has a pair of sipe walls (12a). The sipe walls (12a) are not provided with the pattern portion 7. In the present embodiment, the sipe walls (12a) of all of the sipes 12 are not provided with the pattern portion 7.

In the present embodiment, the pattern portion 7 is provided on groove walls 13 of the circumferential grooves 10 and groove walls 14 of the axial grooves 11. The pattern portion 7 is provided on groove walls 13A of the crown circumferential grooves 10A and groove walls 13B of the shoulder circumferential grooves 10B, for example. Further, the pattern portion 7 is provided on groove walls 14A of the crown axial grooves 11A, groove walls 14B of the middle axial grooves 11B, groove walls 14C of the shoulder axial grooves 11C, and groove walls 14D of the shoulder small axial grooves 11D.

As shown in FIGS. 2A and 2B, it is preferred that the pattern portion 7 is not provided on the groove bottom 5. Since the groove bottom 5 is unlikely to come into contact with mud, even if the pattern portion 7 is provided here, the mud performance may not be improved. In addition, vibration during running is less likely to be transmitted to the groove bottom 5 than to the groove walls 4. Therefore, if the micro-protrusions 8 are provided in the groove bottom 5, mud clogging in the groove is likely to occur, thereby, the mud performance may not be improved.

It is preferred that the pattern portion 7 is formed in the range of 20% to 60% of the groove depth (D) of each of the grooves 3 from an outer edge (4e) (ground contacting surface (2a)) in the tire radial direction of each of the groove walls 4. In other words, since an outer end (7e) in the tire radial direction of the pattern portion 7 is located 20% or more of the groove depth (D) from the outer edge (4e), the shearing force in the tire radial direction by the outer edge (4e) (an edge of the groove 3) and the shearing force, the scratching force, and the frictional force by the micro-protrusions 8 are compatible, therefore, the mud performance is improved. In addition, since an inner end (7i) in the tire radial direction of the pattern portion 7 is located 60% or less of the groove depth (D) from the outer edge (4e), mud clogging in each of the grooves 3 is effectively suppressed. From such a point of view, it is more preferred that the outer end (7e) of the pattern portion 7 is located at 30% or more of the groove depth (D) from the outer edge (4e), and that the inner end (7i) of the pattern portion 7 is located at 50% or less of the groove depth (D).

In order to effectively exert the above-mentioned effects, a length (H) in the tire radial direction of the pattern portion 7 is preferably 20% or more of the groove depth (D), more preferably 25% or more, and preferably 40% or less, more preferably 35% or less of the groove depth (D).

The pattern portion 7 is preferably formed over 50% or more, more preferably 70% or more of a longitudinal length (omitted in the figure) of each of the grooves 3 in order to improve the mud performance. In the present embodiment, the pattern portion 7 is formed over 100% of the longitudinal length of each of the grooves 3 (all of the longitudinal lengths of the grooves 3).

Figure 3:
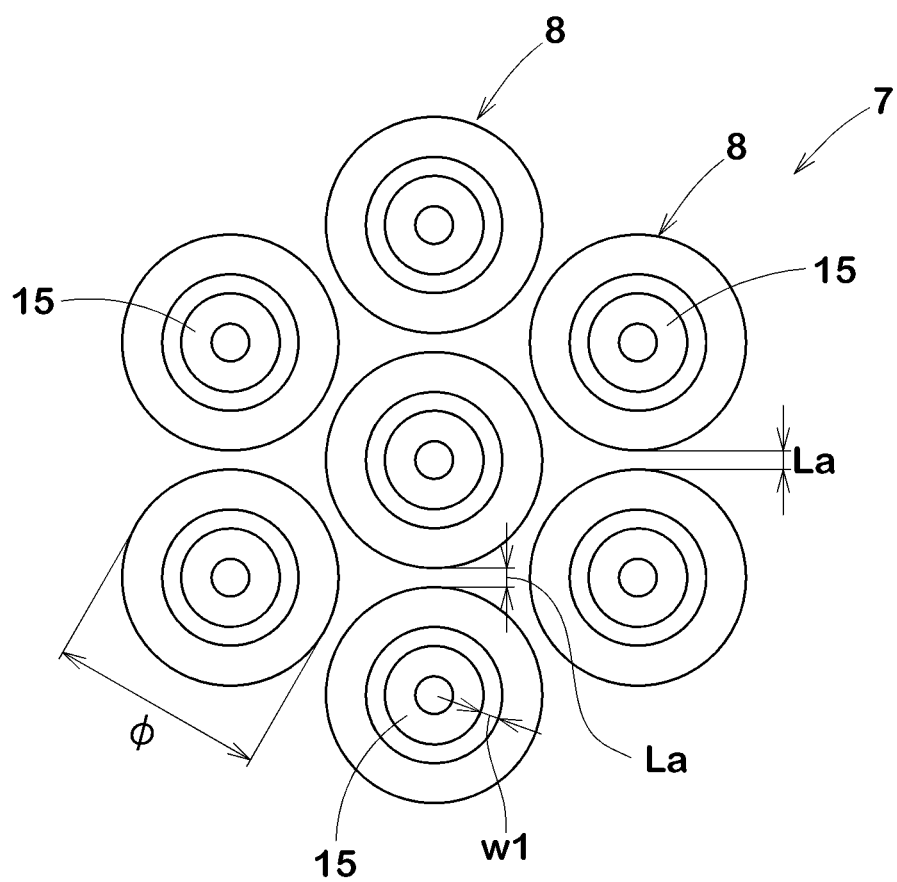
FIG. 3 a plan view of the micro-protrusions.
Figure 4:
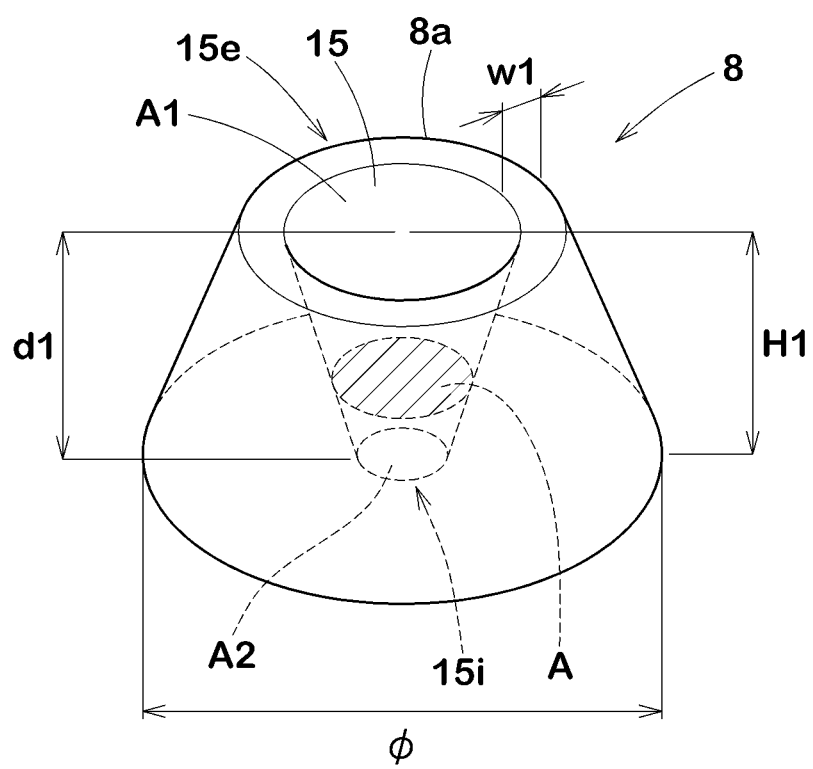
FIG. 4 a perspective view of one of the micro-protrusions.

FIG. 3 is an enlarged plan view of the micro-protrusions 8. FIG. 4 is a perspective view of one of the micro-protrusions 8. As shown in FIGS. 3 and 4, each of the micro-protrusions 8 has a truncated conical shape in the present embodiment. Therefore, it is possible that the micro-protrusions 8 maintain their rigidity high and exert the shearing force and the like in multiple directions. It should be noted that the shape of the micro-protrusions 8 is not limited to a truncated conical shape, but can be a cylindrical or pyramidal shape, for example.

It is preferred that a protrusion height H1 of each of the micro-protrusions 8 is 0.1 mm or more and 0.5 mm or less. Since the protrusion height of each of the micro-protrusions is 0.1 mm or more, the shearing force and the like are effectively exerted, therefore, it is possible that the mud performance is improved. Since the protrusion height of each of the micro-protrusions 8 is 0.5 mm or less, mud adhesion is suppressed, and chipping and cracking are suppressed, therefore, the mud performance is maintained. From such a point of view, the protrusion height H1 of each of the micro-protrusions 8 is more preferably 0.15 mm or more, and more preferably 0.45 mm or less.

It is preferred that each of the micro-protrusions 8 has an outer diameter φ of 0.1 mm or more and 0.5 mm or less. Since the outer diameter φ of each of the micro-protrusions 8 is 0.1 mm or more, it is possible that the mud performance is improved. Since the outer diameter φ of each of the micro-protrusions 8 is 0.5 mm or less, durability performance of the micro-protrusions 8 is maintained, therefore, degradation of the mud performance is suppressed. From such a point of view, it is more preferred that the protrusion height of each of the micro-protrusions 8 is 0.15 mm or more and 0.45 mm or less.

A distance (La) between the micro-protrusions 8 adjacent to each other is preferably 0.2 mm or less, more preferably 0.15 mm or less, and further preferably 0.10 mm or less. Since the micro-protrusions 8 are arranged at the distance (La) like this, it is possible that the scratching force, the shearing force, and the frictional force against mud that has entered in the grooves 3 are increased.

Each of the micro-protrusions 8 has a recessed portion 15 provided at a protrusion top portion (8a). The recessed portion 15 configured as such can shear the mud within the recessed portion 15, therefore, the mud performance is further improved.

The aperture shape of the recessed portion 15 is circular, for example. The recessed portion 15 configured as such suppresses the decrease in rigidity of each of the micro-protrusions 8. The aperture shape of the recessed portion 15 is not limited to this manner, but may be oval, triangular, or rectangular, for example.

It is preferred that a depth (d1) of the recessed portion 15 is 70% or more and 100% or less of the protrusion height H1 of each of the micro-protrusions 8. Since the depth (d1) of the recessed portion 15 is 70% or more of the protrusion height H1, a large amount of mud and dirt can be secured to enter the recessed portion 15. Since the depth (d1) of the recessed portion 15 is within 100% of the protrusion height H1, the rigidity of each of the micro-protrusions 8 is maintained high, and thus it is possible that the mud performance is maintained high for a long time.

In the present embodiment, the recessed portion 15 has an aperture area (A) decreasing toward the inner side in the projection height direction. The recessed portion 15 helps to maintain the rigidity of each of the micro-protrusions 8 even higher, and also facilitates the discharge of mud filled in the recessed portion 15.

In order to effectively exert such effects, a ratio (A2/A1) of an aperture area A1 at an outer end (15e) (protrusion top portion (8a)) in the protrusion height direction of the recessed portion 15 and an aperture area A2 at an inner end (15i) in the protrusion height direction of the recessed portion 15 is preferably 20% or more, more preferably 30% or more, and preferably 60% or less, more preferably 50% or less.

It is preferred that a width (w1) of the protrusion top portion (8a) other than the recessed portion 15 is 0.03 mm or more and 0.08 mm or less. Since the width (w1) is 0.03 mm or more, the rigidity of each of the micro-protrusions 8 is maintained high. Since the width (w1) is 0.08 mm or less, the aperture area (A) is secured, therefore, the shearing force against mud is increased.

Figure 5A:
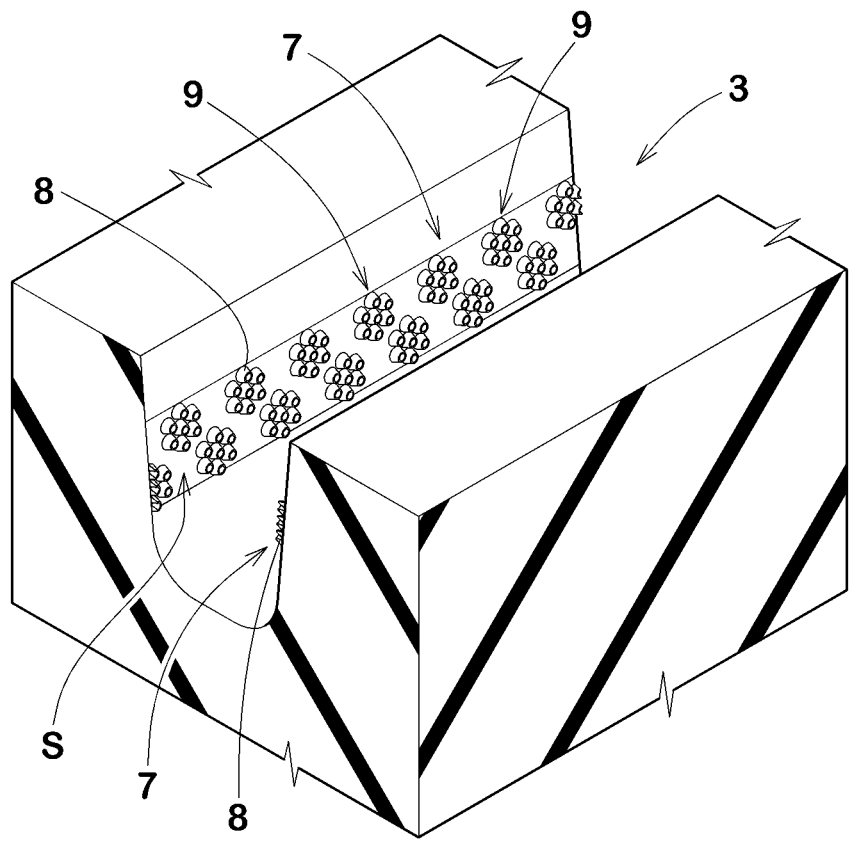
FIG. 5A a perspective view of one of the grooves according to another embodiment.

FIG. 5A is a perspective view of one of the grooves 3 according to another embodiment. The same reference sign is given to the same components as in the above-described embodiment and explanation thereof is omitted. As shown in FIG. 5A, in the present embodiment, the pattern portion 7 is formed such that a plurality of micro-protrusion groups 9 each made up of a plurality of the micro-protrusions 8 is provided. The micro-protrusion groups 9 are arranged with a gap (S) between each other group larger than the outer diameter φ of each of the micro-protrusions 8. The pattern portion 7 configured as such suppresses the decrease of the groove volume of each of the grooves 3, therefore, it is possible that the shearing force, the frictional force, and the scratching force are exerted against more mud.

Figure 5B:
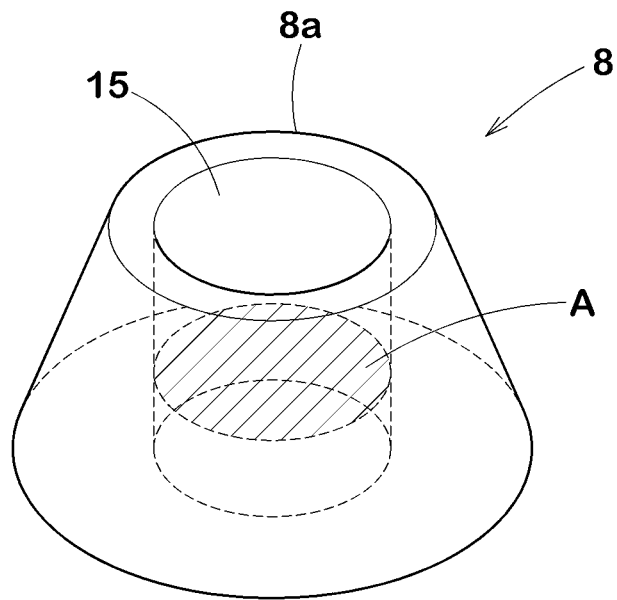
FIG. 5B a perspective view of one of the micro-protrusions according to another embodiment.

FIG. 5B is a perspective view of one of the micro-protrusions 8 according to another embodiment. The same reference sign is given to the same components as in the above-described embodiment and explanation thereof is omitted. As shown in FIG. 5B, in the present embodiment, the recessed portion 15 of each of the micro-protrusions 8 is formed to have a constant aperture area (A) in the projection height direction. The recessed portion 15 configured as such can shear a lot of mud and dirt, therefore, it is possible that the mud performance is improved.

While detailed description has been made of the tire according to an embodiment of the present disclosure, the present disclosure can be embodied in various forms without being limited to the illustrated embodiments.

EXAMPLES

Tires of size 265/65R18 having the basic pattern of FIG. 1 were made by way of test according to the specification of Table 1, and each of the test tires was tested for the mud performance and the noise performance. The basic configuration of the pattern portion is shown in FIGS. 2A and 2B. The common specifications and test methods for each test tire are as follows. It should be noted that the test tires were so-called all-season tires for SUVs.

<Mud Performance>

Test tires were mounted on all wheels of a test vehicle under the following conditions. Then a test driver drove the test vehicle on a muddy test course. The test driver evaluated running characteristics related to steering responsiveness, traction, and grip by the driver's senses during the test drive. The results are indicated by an evaluation point based on Reference 1 being 100, wherein the larger the numerical value, the better the result is.

Tire inner pressure (all wheels): 230 kPa
Vehicle: 4WD-car (SUV)
Displacement of vehicle: 2500 cc
Protrusion height of micro-protrusion: 0.3 mm
Outer diameter of micro-protrusion: 0.3 mm <Noise Performance>

The test driver drove the above test vehicle on a dry asphalt road surface at 70 km/h. The test driver evaluated the noise by the driver's senses during the test drive. The results are indicated by an evaluation point based on Reference 1 being 100. The larger the numerical value, the better the noise performance is. The test results are shown in Table 1.

TABLE 1

|  | Ref. 1 | Ref. 2 | Ex. 1 | Ex. 2 | Ex. 3 | Ex. 4 | Ex. 5 |
|---|---|---|---|---|---|---|---|
| Density of Micro-protrusions [per 1 mm$^2$] | 0.5 | 6 | 3 | 1 | 5 | 3 | 3 |
| Position of Outer end of Pattern portion* [%] (Distance from Outer edge of Groove wall) | 30 | 30 | 30 | 30 | 30 | 10 | 20 |
| Position of Inner end of Pattern portion* [%] (Distance from Outer edge of Groove wall) | 50 | 50 | 50 | 50 | 50 | 70 | 60 |
| Mud performance [evaluation point: larger is better] | 100 | 102 | 110 | 108 | 108 | 106 | 108 |
| Noise performance [evaluation point: larger is better] | 100 | 100 | 100 | 100 | 100 | 100 | 100 |

*Ratio (%) of distance from outer edge of groove wall/groove depth

From the test results it was confirmed that the tires in Examples improved the mud performance without impairing the noise performance.

Statement of Disclosure

The present disclosure includes the following aspects.

Present Disclosure 1

A tire including a tread portion, wherein
the tread portion is provided with grooves,
each of the grooves includes a pair of groove walls,
at least one of the groove walls is provided on a surface thereof with a pattern portion having a plurality of micro-protrusions, and
the pattern portion is provided with the micro-protrusions at a density of 1 to 5 per 1 mm$^2$ of the groove wall area.

Present Disclosure 2

The tire according to Present disclosure 1, wherein both of the groove walls are provided with the pattern portion.

Present Disclosure 3

The tire according to Present disclosure 1 or 2, wherein the grooves include circumferential grooves extending in a tire circumferential direction and axial grooves extending in a tire axial direction, and the groove walls of the circumferential grooves and the axial grooves are provided with the pattern portion.

Present Disclosure 4

The tire according to any one of Present disclosures 1 to 3, wherein, the pattern portion is formed in a range of 20% or more and 60% or less of a groove depth of each of the grooves from an outer edge in a tire radial direction of the at least one or each of the groove walls.

Present Disclosure 5

The tire according to any one of Present disclosures to 4, wherein each of the micro-protrusions has a protrusion height of 0.1 mm or more and 0.5 mm or less.

Present Disclosure 6

The tire according to any one of Present disclosures to 5, wherein each of the micro-protrusions has an outer diameter of 0.1 mm or more and 0.5 mm or less.

Present Disclosure 7

The tire according to any one of Present disclosures 1 to 6, wherein each of the micro-protrusions has a truncated conical shape.

Present Disclosure 8

The tire according to any one of Present disclosures to 7, wherein each of the micro-protrusions has a protrusion top portion and a recessed portion provided at the protrusion top portion.

Present Disclosure 9

The tire according to Present disclosure 8, wherein the recessed portion has a depth of 70% or more and 100% or less of a protrusion height of each of the micro-protrusions.

Present Disclosure 10

The tire according to Present disclosure 8 or 9, wherein the recessed portion has an aperture area decreasing toward an inner side in the projection height direction.

Present Disclosure 11

The tire according to any one of Present disclosures 8 to 10, wherein the recessed portion has a circular aperture shape.

Present Disclosure 12

The tire according to any one of Present disclosures 1 to 11, wherein each of the grooves has a groove bottom, and the groove bottom is not provided with the pattern portion.

DESCRIPTION OF REFERENCE SIGNS 1 tire
2 tread portion
3 groove
4 groove wall
4s surface
7 pattern portion
8 micro-protrusions

The invention claimed is:

1. A tire comprising a tread portion, wherein
the tread portion is provided with grooves,
each of the grooves includes a pair of groove walls,
at least one of the groove walls is provided on a surface thereof with a pattern portion having a plurality of micro-protrusions,
the pattern portion is provided with the micro-protrusions at a density of 1 to 5 per 1 mm² of the groove wall area, and
the pattern portion includes a plurality of micro-protrusion groups each made up of a plurality of the micro-protrusions,
the micro-protrusion groups are arranged with a gap between the groups adjacent to each other,
the gap is larger than an outer diameter of each of the micro-protrusions,
in each pair of the micro-protrusions adjacent to each other, a distance between the micro-protrusions is smaller than an outer diameter of each of the micro-protrusions in each of the micro-protrusion groups, and
the micro-protrusion groups are arranged in a repeating pattern in the pattern portion.

2. The tire according to claim 1, wherein both of the groove walls are provided with the pattern portion.

3. The tire according to claim 1, wherein
the grooves include circumferential grooves extending in a tire circumferential direction and axial grooves extending in a tire axial direction, and
the groove walls of the circumferential grooves and the axial grooves are provided with the pattern portion.

4. The tire according to claim 3, wherein
the circumferential grooves include a pair of crown circumferential grooves arranged on both sides of a tire equator, and a pair of shoulder circumferential grooves, each shoulder circumferential groove arranged axially outside a respective one of the crown circumferential grooves,
the axial grooves include crown axial grooves, middle axial grooves, shoulder axial grooves, and shoulder small axial grooves,
each of the crown axial grooves extend axially inward from a respective one of the crown circumferential grooves,
each of the middle axial grooves connects one of the crown circumferential grooves and one of the shoulder circumferential grooves adjacent thereto,
each of the shoulder axial grooves connects one of the shoulder circumferential grooves and one of tread edges adjacent thereto, and
each of the shoulder small axial grooves extends axially inward from one of the tread edges and has a length smaller than a length of each of the shoulder axial grooves.

5. The tire according to claim 1, wherein the pattern portion is formed in a range of 20% or more and 60% or less of a groove depth of each of the grooves from an outer edge in a tire radial direction of the at least one or each of the groove walls.

6. The tire according to claim 1, wherein each of the micro-protrusions has a protrusion height of 0.1 mm or more and 0.5 mm or less.

7. The tire according to claim 1, wherein each of the micro-protrusions has an outer diameter of 0.1 mm or more and 0.5 mm or less.

8. The tire according to claim 1, wherein each of the micro-protrusions has a truncated conical shape.

9. The tire according to claim 1, wherein each of the micro-protrusions has a protrusion top portion and a recessed portion provided at the protrusion top portion.

10. The tire according to claim 9, wherein the recessed portion has a depth of 70% or more and 100% or less of a protrusion height of each of the micro-protrusions.

11. The tire according to claim 9, wherein the recessed portion has an aperture area decreasing toward an inner side in the projection height direction.

12. The tire according to claim 11, wherein a ratio (A2/A1) of an aperture area (A2) at an inner end in a protrusion height direction of the recessed portion to an aperture area (A1) at an outer end in the protrusion height direction of the recessed portion is 20% or more and 60% or less.

13. The tire according to claim 9, wherein the recessed portion has a circular aperture shape.

14. The tire according to claim 9, wherein a width of a protrusion top portion excluding the recessed portion is 0.03 mm or more and 0.08 mm or less.

15. The tire according to claim 9, wherein the recessed portion has a constant aperture area in a projection height direction.

16. The tire according to claim 1, wherein
each of the grooves has a groove bottom, and
the groove bottom is not provided with the pattern portion.

17. The tire according to claim 16, wherein the groove bottom is an area within 10% of a groove depth from a maximum depth portion in each of the grooves.

18. The tire according to claim 1, wherein the pattern portion is formed over 50% or more of a longitudinal length of each of the grooves.

19. The tire according to claim 1, wherein a distance between the micro-protrusions adjacent to each other is 0.2 mm or less.

20. A tire comprising a tread portion, wherein
the tread portion is provided with grooves,
each of the grooves includes a pair of groove walls,
at least one of the groove walls is provided on a surface thereof with a pattern portion having a plurality of micro-protrusions wherein there are no micro-protrusions outside the pattern portion,
the pattern portion is provided with the micro-protrusions at a density of 1 to 5 per 1 mm² of the groove wall area, and
an outer end in a tire radial direction of the pattern portion is located at a position that is 20% or more of the groove depth from an outer edge in the tire radial direction of the at least one or each of the groove walls.

* * * * *